US006854384B2

(12) United States Patent
Bartlett

(10) Patent No.: US 6,854,384 B2
(45) Date of Patent: Feb. 15, 2005

(54) PACKING ATTACHMENT FOR FRONT LOADER MACHINES

(76) Inventor: George Bartlett, 33 Hilltop Dr., Branford, CT (US) 06405

(*) Notice: Subject to any disclaimer, the term of this patent is extended or adjusted under 35 U.S.C. 154(b) by 203 days.

(21) Appl. No.: 09/854,618

(22) Filed: May 14, 2001

(65) Prior Publication Data

US 2002/0166466 A1 Nov. 14, 2002

(51) Int. Cl.[7] .............................. B65G 3/04; B30B 1/02; B30B 15/06

(52) U.S. Cl. ..................... 100/69; 100/229 A; 100/245; 100/293; 100/295

(58) Field of Search ............................ 100/100, 229 A, 100/245, 227, 226, 65, 67, 68, 69

(56) References Cited

U.S. PATENT DOCUMENTS 2,994,262 A * 8/1961 Bator .......................... 100/65
3,091,159 A 5/1963 Miller
3,376,799 A 4/1968 Perry et al.
3,635,133 A 1/1972 Stougaard
4,087,010 A 5/1978 Stormon
4,805,707 A * 2/1989 Davis et al. ................ 173/210
4,808,027 A 2/1989 Anderson
5,025,720 A * 6/1991 Bates ......................... 100/100
5,365,837 A 11/1994 Lowery
6,061,933 A 5/2000 Rogge

* cited by examiner

*Primary Examiner*—Allen Ostrager
*Assistant Examiner*—Shelley Self
(74) *Attorney, Agent, or Firm*—Bachman & LaPointe, PC

(57) ABSTRACT

A packing attachment for front loader machines includes a substantially elongate shaft having a longitudinal axis, a mount and a compacting end, the mount end having a mounting structure disposed thereon, the mounting structure defining spaced mounting points for connecting to a front loader machine, and the spaced mounting points defining a plane which is disposed at an angle to the longitudinal axis of between about 60° and about 80°.

10 Claims, 2 Drawing Sheets

PACKING ATTACHMENT FOR FRONT LOADER MACHINES

BACKGROUND OF THE INVENTION

The invention relates to a packing attachment for front loader machines.

Trailers are frequently used for transporting various materials from location to location. For example, trailers are frequently used for transferring refuse from transfer stations to disposal or recycling sites, and the like. Refuse or other garbage material is frequently dumped into such trailers, and the efficient packing of such material into these trailers is an important concern.

It is frequently desirable to compact material within such trailers, and various heavy equipment such as front loader machines and the like have been used for performing this function. Typically, the front loader machine is on a platform and an attachment for the front loader is forced down into the trailer to compact material therein. All attachments for such front loading machines known to the present inventor involve structures which are connected to the front loader connection mechanism so as to project substantially straight forward.

Conventional mounting or quick disconnect structure for front loading machines involves spaced-point mounting structures which are disposed in a plane that is substantially perpendicular to the body of the attachment. Unfortunately the conventional structure of such front loading machines and these attachments prevent the front loader from positioning the attachment straight down into the trailer, and this results in a failure to pack the refuse material into the trailer as efficiently and evenly as desired.

Further, existing attachments to front loading equipment, when used to attempt to compact trash in a trailer, have rearwardly-facing structure which can become entangled with the inner structure of the trailer and damage same.

In light of the foregoing, it is clear that the need remains for improved structures for use in compacting trash in trailers.

It is therefore the primary object of the present invention to provide an attachment for front loader machines which can advantageously be used to efficiently compact trash in a trailer, without damaging the trailer.

Other objects and advantages of the present invention will appear hereinbelow.

SUMMARY OF THE INVENTION

In accordance with the present invention, the foregoing objects and advantages have been readily attained. According to the invention, a packing attachment for front loader machines is provided, which attachment comprises a substantially elongate shaft having a longitudinal axis, a mount end and a compacting end, said mount end having a mounting structure disposed thereon, said mounting structure defining spaced mounting points for connecting to a front loader machine, and said spaced mounting points defining a plane which is disposed at an angle to said longitudinal axis of between about 60° and about 80°.

In further accordance with the present invention, the compacting end of the apparatus is preferably a substantially planar shoe having an outer edge, and deflection walls are positioned between the shaft and the outer edge.

The angling of the attachment of the present invention allows a front loading machine equipped with this device to position the attachment in a straight-down orientation so as to further efficiently compact trash in a trailer from an elevated platform, and the deflection walls positioned rearwardly from the planar shoe advantageously serve to deflect the shoe away from walls of the trailer so as to avoid damaging same while removing the attachment from the trailer.

BRIEF DESCRIPTION OF THE DRAWINGS

A detailed description of preferred embodiments of the present invention follows, with reference to the attached drawings, wherein.

DETAILED DESCRIPTION

Figure 4:
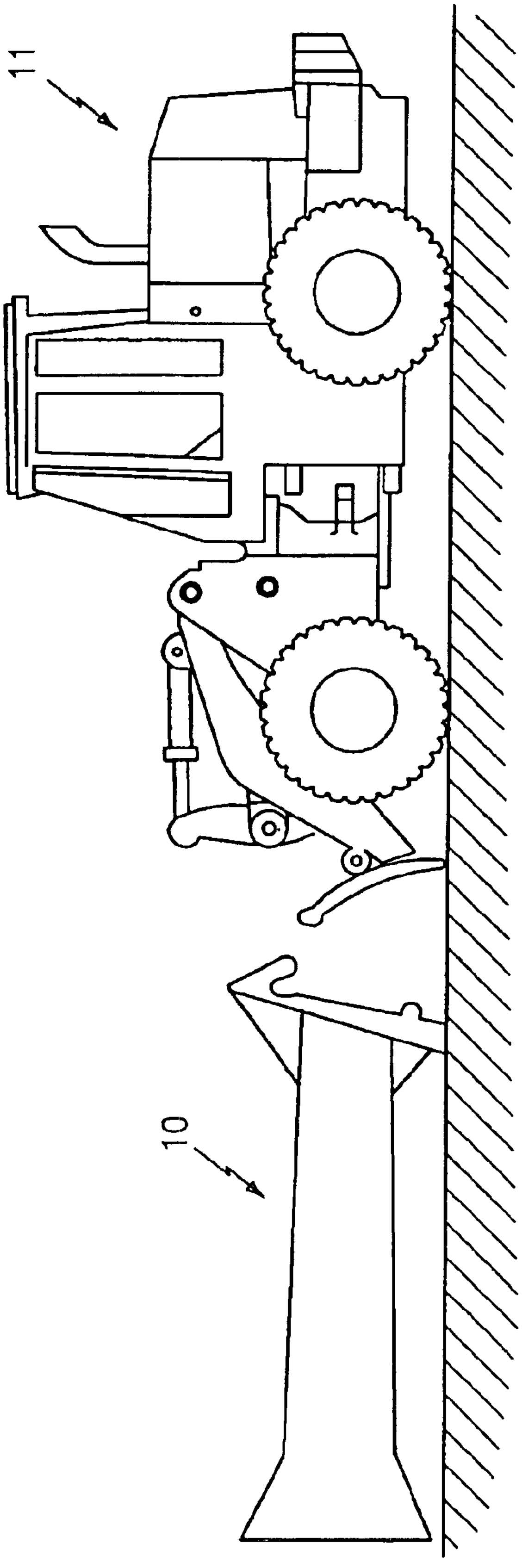
FIG. 4 is a side schematic view of an attachment and a front end loader.

The invention relates to an attachment 10 for front loader machines 11 (see FIG. 4) which is adapted to connect to such front loader machines such that the attachment can be directed or oriented straight downwardly from the front loader for use in compacting trash in trailers from a platform elevated above or at the same level as the top edge of the trailer.

Figures 1, 2, 3:
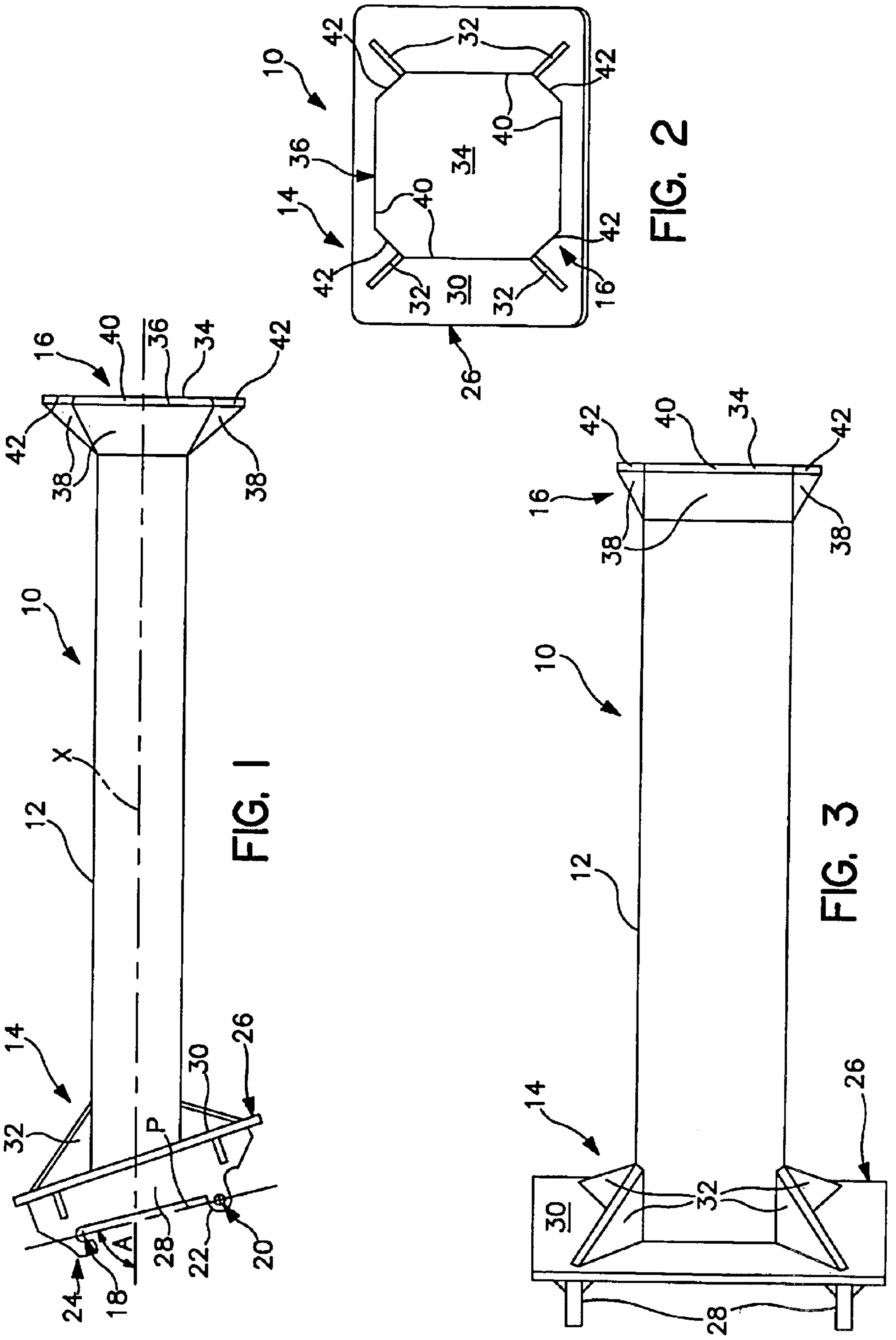
FIG. 1 is a side view of an attachment in accordance with the present invention.
FIG. 2 is an end view of an attachment in accordance with the present invention.
FIG. 3 is a top view of an attachment in accordance with the present invention.

FIGS. 1–3 illustrate an attachment 10 in accordance with the present invention. As shown, attachment 10 is a substantially elongate member or shaft 12 having a mount end 14 and a compacting end 16.

Mount end 14 is advantageously a structure adapted for convenient connection or disconnection from front loaders, and defines spaced mounting points 18, 20 which are in a plane and which are adapted for connection to the operative arm of a front loader machine. As shown in FIG. 1, the spaced mounting points may be defined as two lower rings 22 which are spaced from each other and adapted to be connected to pins (not shown) of a front loader machine, and two upper hook members 24 which are also spaced and adapted to be connected over corresponding structure of a front loader machine. As shown, shaft 12 has a longitudinal axis X and spaced mounting points 18, 20 are positioned in a plane P.

In accordance with the invention, spaced mounting points 18, 20 are defined such that plane P is positioned at an angle A relative to longitudinal axis X of between about 60° and about 80°. This is critical in that such angling allows for the operative arm of a conventional front loader machine to be used to position attachment 10 in a straight-down orientation from a platform into a trailer as desired. Ideally, angle A is substantially 70°.

In accordance with the present invention, mount end 14 may further be provided having a substantially planar member 26, with rearwardly extending structure 28 defining spaced mounting points 18, 20, and with a front surface 30 connected to shaft 12, for example with stabilizing members 32 positioned therebetween for strengthening and stabilizing attachment 10. Planar member 26 may also be angled with respect to axis X at an angle between about 60° and about 80°.

Compacting end 16 is preferably provided as a substantially planar shoe 34 having an outer edge 36 defining an area which is greater than the cross sectional area of shaft 12, and deflection walls 38 are advantageously positioned between shaft 12 and outer edge 36 as shown such that, preferably, the entire edge 36 of shoe 34 is shielded or covered by deflection walls 38. This advantageously prevents shoe 34 from engaging with walls of a trailer or any other structure of a trailer while attachment 10 is being removed therefrom so as to prevent damage to the trailer.

As best shown in FIG. 2, shoe 34 preferably has a substantially square shape with four long sides 40, and with flattened corners 42. Further, as best shown in FIGS. 1 and 3, deflection walls 38 are preferably provided and correspond with long sides 40 and flat corners 42 as well, so that no rearward flat or perpendicular surface, as considered with respect to longitudinal axis X, is presented on compacting end 16.

Shaft 12 may advantageously be a substantially square piece of durable material, for example, plate steel.

Although the size of attachment 10 may be dictated by particular uses, it has been found that attachment 10 can advantageously be provided having a length from mounting end 14 to compacting end 16 of about 10 feet, with shoe 34 having approximately 27 inch sides, and with shaft 12 being rectangular and approximately 20 inches by 12 inches in size.

This steel is advantageously between about ¾ inch and about 1 inch in thickness, and the attachment can be prepared having a weight of approximately 2000 pounds without exceeding safe operation for most front loader machines.

Attachment 10 in accordance with the present invention can be advantageously used to efficiently pack refuse in trailers, which can substantially increase the weight per load of a trailer, while the deflection walls 38 advantageously minimize damage to the trailer while loading. Further, this efficient packing can advantageously allow for more uniform loads, thereby making application of a tarp over the trailer easier, and keeping loads water level.

Finally, attachment 10 can be used to break up bulky material such as window panes, sheet rock and wood in general, so as to further efficiently pack such materials for transport in trailers.

It should be readily appreciated that the attachment in accordance with the present invention is extremely useful, for example at recycling centers and transfer stations, where efficient packing without damage to trailers is desirable, especially from elevated platforms using a front end loader.

It should also be appreciated that although the mounting points are illustrated in a particularly desirable embodiment, other types of structures can be used as the mounting points. Furthermore, although the compacting shoe is shown in a preferred embodiment having substantially square shape with flat corners, other shapes can be provided as well. For example, the compacting shoe can be provided having a round shape, if desired, although this would complicate the proper positioning of deflection walls 38 by dictating a conical shape. Nevertheless, this structure is clearly considered within the broad scope of the present invention.

It should also be appreciated that the attachment of the present invention could be manufactured from other materials, as well, although the present disclosure in terms of plate steel is readily assembled using known welding techniques.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A packing attachment for front loader machines, said packing attachment comprising a substantially elongate shaft having a longitudinal axis, a mount end and a compacting end, said mount end having a mounting structure disposed thereon, said mounting structure defining spaced mounting points for connecting to a front loader machine, and said spaced mounting points defining a plane which is disposed at an angle to said longitudinal axis; wherein said angle is between about 60° and about 80°, and further wherein the spaced mounting points are defined by upper and lower mounting points are defined by upper and lower mounting points, and wherein said angle is defined between said longitudinal axis and a line extending from said upper mounting points and through said lower mounting points.

2. The apparatus of claim 1, wherein said mounting structure further comprises a planar member connected to said shaft and having a rear surface, said spaced mounting points being disposed on said rear surface.

3. The apparatus of claim 2, wherein said planar member is positioned at an angle with said longitudinal axis of between about 60° and about 80°.

4. A packing attachment for front loader machines, said packing attachment comprising a substantially elongate shaft having a longitudinal axis, a mount end and a compacting end, said mount end having a mounting structure disposed thereon, said mounting structure defining spaced mounting points for connecting to a front loader machine, and said spaced mounting points defining a plane which is disposed at an angle to said longitudinal axis, wherein said angle is between about 60° and about 80°, wherein said compacting end is a substantially planar shoe having an outer edge and being mounted to said shaft, and further comprising deflection walls positioned from said shaft to said outer edge.

5. The apparatus of claim 4, wherein said deflection walls are disposed along the entire extent of said outer edge.

6. The apparatus of claim 4, wherein said planar shoe is substantially square in shape, with flat corners, and wherein said deflection walls are disposed along sides of said square shape and said flat corners.

7. The apparatus of claim 4, wherein said shoe has an area which is larger than a cross sectional area of said shaft.

8. The apparatus of claim 1, further comprising stabilizing members disposed between said shaft and said mounting structure.

9. The apparatus of claim 1, wherein said packing attachment is substantially rigid from said mount end to said compacting end.

10. The apparatus of claim 2, wherein said planar member is fixed relative to said shaft.

* * * * *